(12) United States Patent
Takemoto

(10) Patent No.: US 7,609,317 B2
(45) Date of Patent: Oct. 27, 2009

(54) ELECTRONIC CAMERA AND AUTOMATIC FOCUSING METHOD FOR GENERATING A LIGHT EXPOSURE CONTROL SIGNAL ACCORDING TO A CENTRAL TIMING

(75) Inventor: Satoshi Takemoto, Tokyo (JP)

(73) Assignee: Sony Corporation, Tokyo (JP)

(*) Notice: Subject to any disclaimer, the term of this patent is extended or adjusted under 35 U.S.C. 154(b) by 672 days.

(21) Appl. No.: 11/171,299

(22) Filed: Jul. 1, 2005

(65) Prior Publication Data
US 2006/0001763 A1    Jan. 5, 2006

(30) Foreign Application Priority Data

Jul. 2, 2004  (JP) .......................... P2004-197194
Dec. 20, 2004 (JP) .......................... P2004-368320

(51) Int. Cl.
G03B 13/00  (2006.01)
H04N 5/232  (2006.01)

(52) U.S. Cl. .......................... 348/349; 396/79; 348/351
(58) Field of Classification Search .................. 348/340, 348/345–357; 396/79, 80, 89, 121, 124
See application file for complete search history.

(56) References Cited

U.S. PATENT DOCUMENTS 5,430,483 A * 7/1995 Haruki ........................ 348/349
5,668,597 A * 9/1997 Parulski et al. .............. 348/350
6,683,652 B1 * 1/2004 Ohkawara et al. ........... 348/347

FOREIGN PATENT DOCUMENTS

| EP | 0 556 783 | 2/1993 |
| JP | 02032681 A * | 2/1990 |
| JP | 08-32862 | 2/1996 |
| JP | 10-239579 | 9/1998 |
| JP | 2002-247443 | 8/2002 |

OTHER PUBLICATIONS

English Translation of JP 02-032681 (JP Document published on Feb. 2, 1990).*

* cited by examiner

*Primary Examiner*—Lin Ye
*Assistant Examiner*—Nelson D. Hernández Hernández
(74) *Attorney, Agent, or Firm*—Finnegan, Henderson, Garrett & Dunner, L.L.P.

(57) ABSTRACT

The present invention provides an electronic camera adapted to perform an accurate auto focus control operation at high speed. The electronic camera comprises a wobbling control section for generating a wobbling control signal for auto focus control of the electronic camera. The wobbling control section is adapted to generate the wobbling control signal for synchronizing exposure to light of a central pixel of the predetermined range in the image with the central timing of a near side stop operation and that of the period of a far side stop operation.

8 Claims, 12 Drawing Sheets

FIG.2 [PRIOR ART]

FIG.4A Scanning operation

FIG.4B Vertical synchronizing signal

FIG.4C Exposure timing of all pixels

FIG.4D Emission of auxiliary light

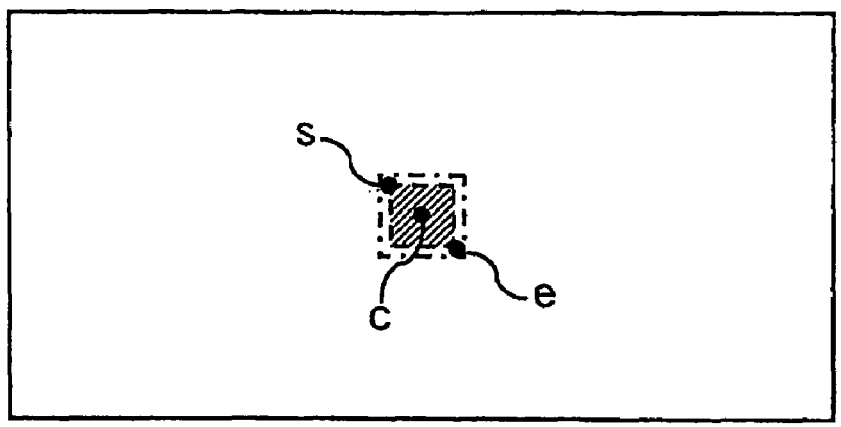
FIG.6A
Specific region
Detection range
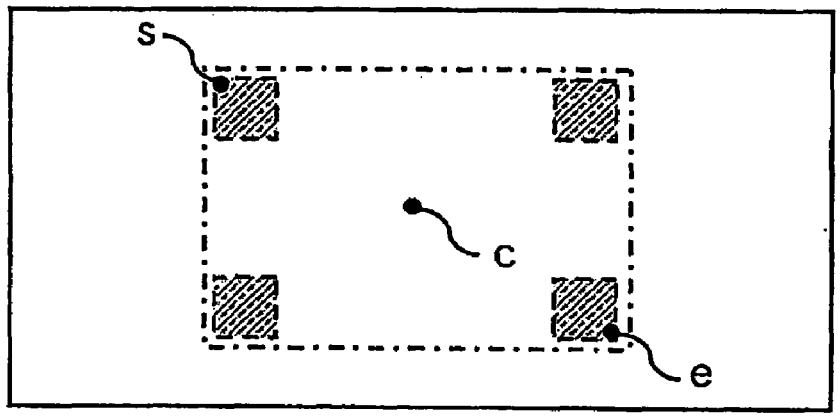
FIG.6B
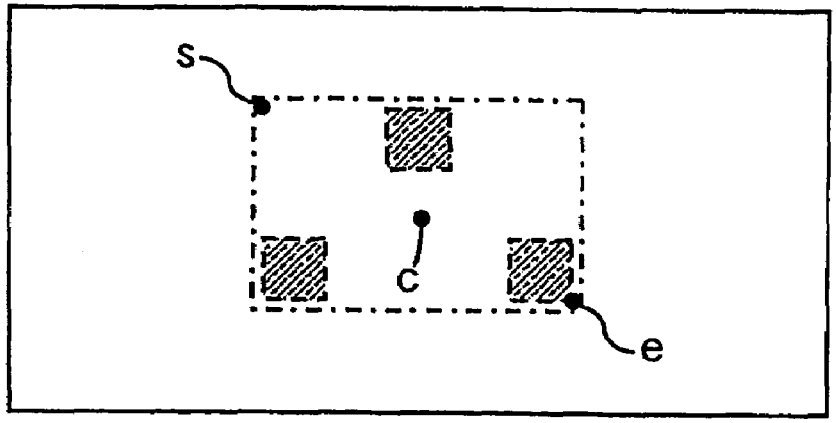
FIG.6C

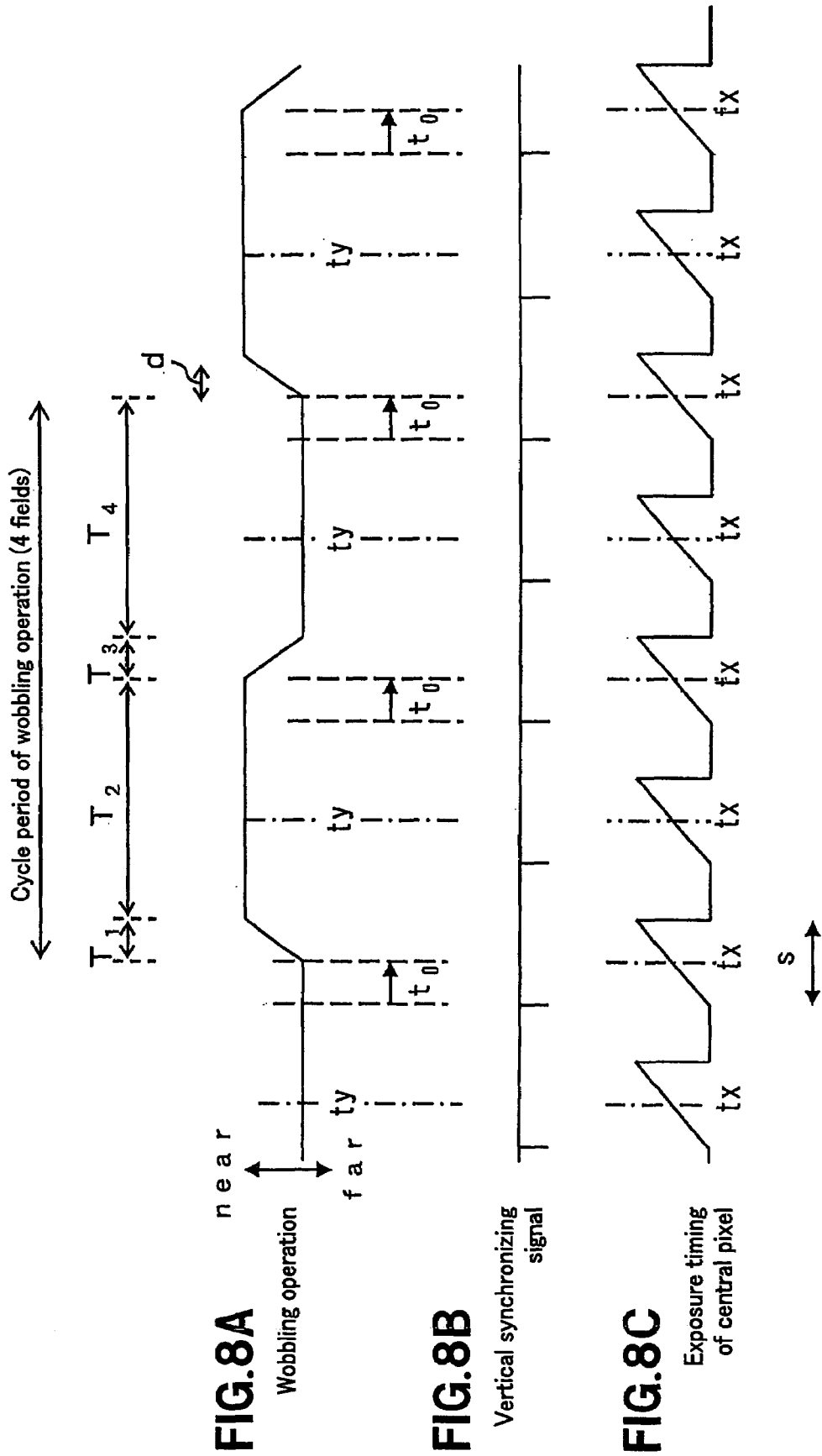

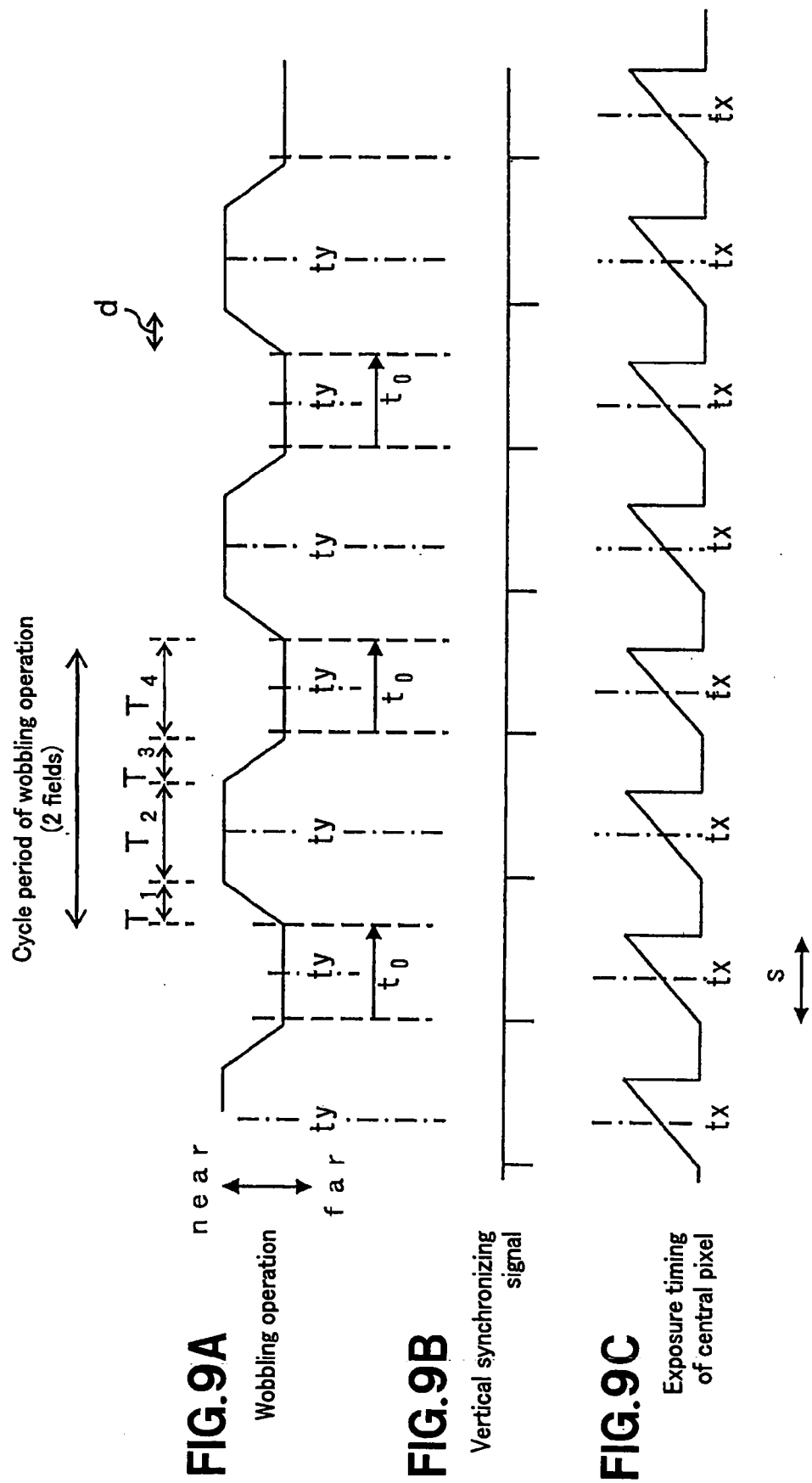

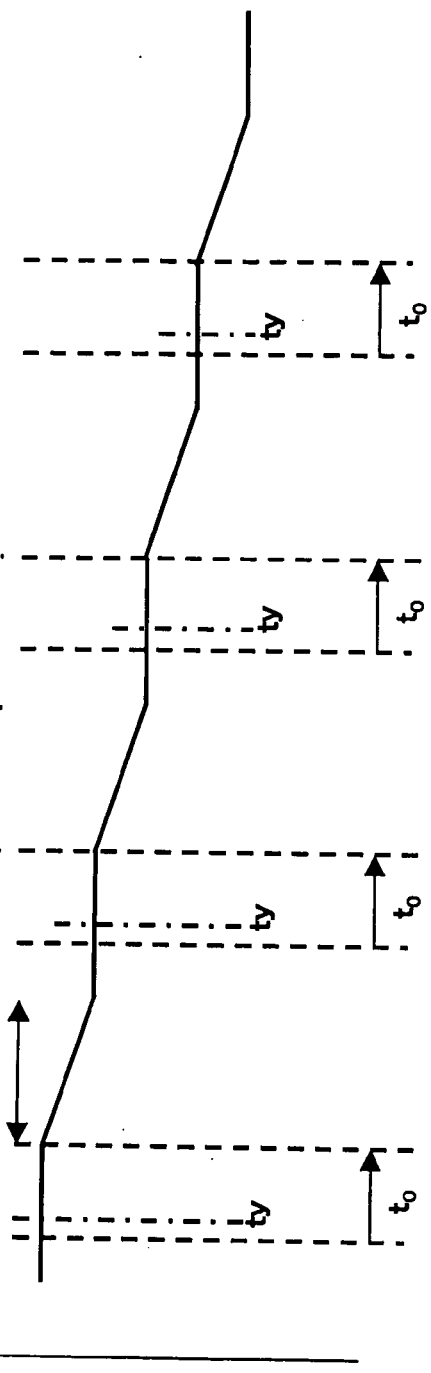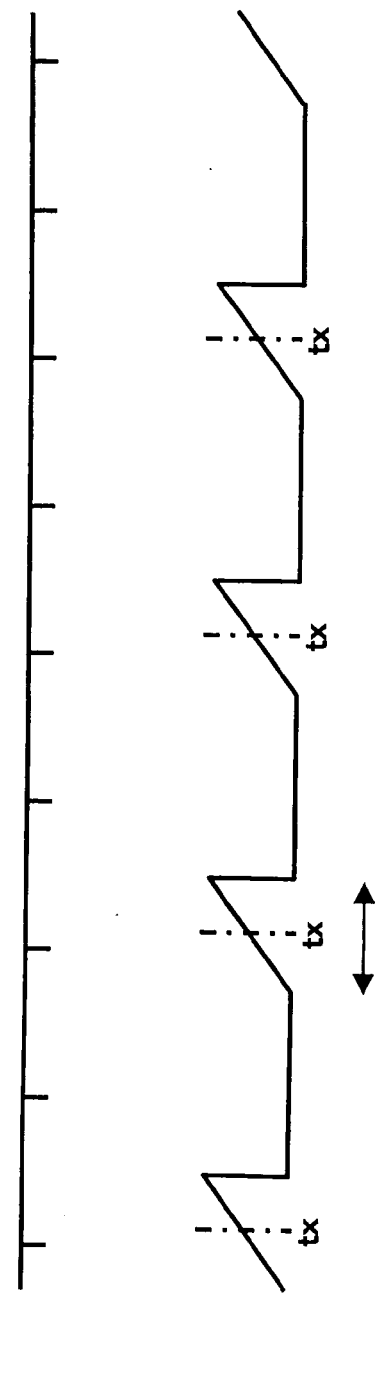
FIG.10A Scanning operation
FIG.10B Vertical synchronizing signal
FIG.10C Exposure timing of central pixel

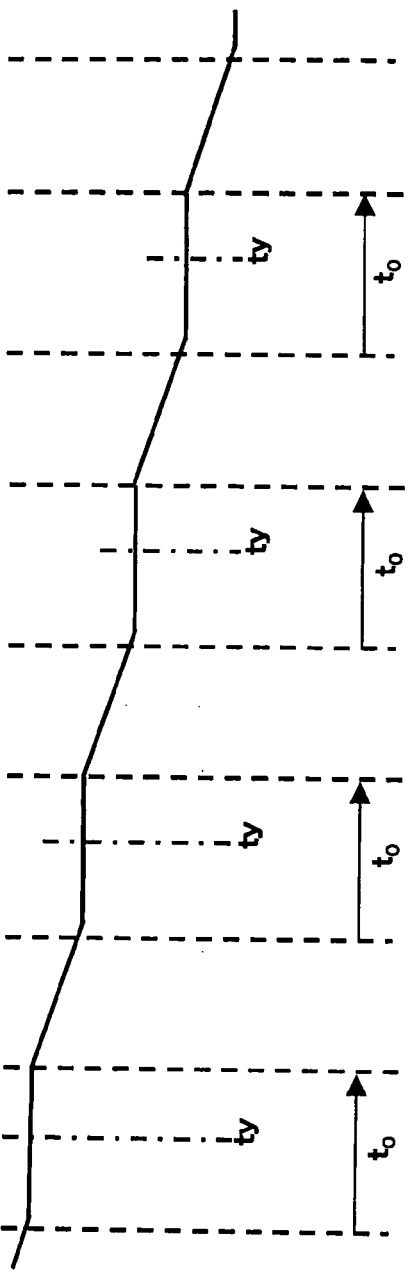
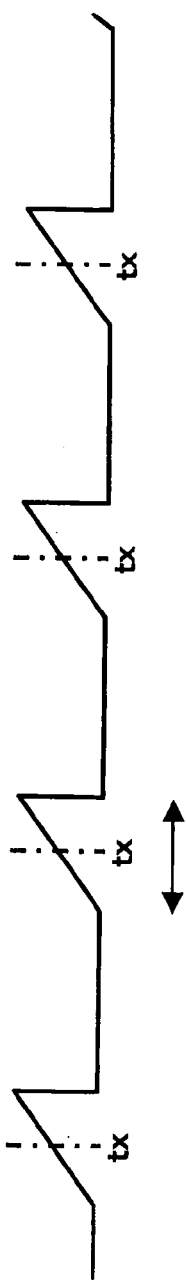
FIG.11A Scanning operation
FIG.11B Vertical synchronizing signal
FIG.11C Exposure timing of central pixel

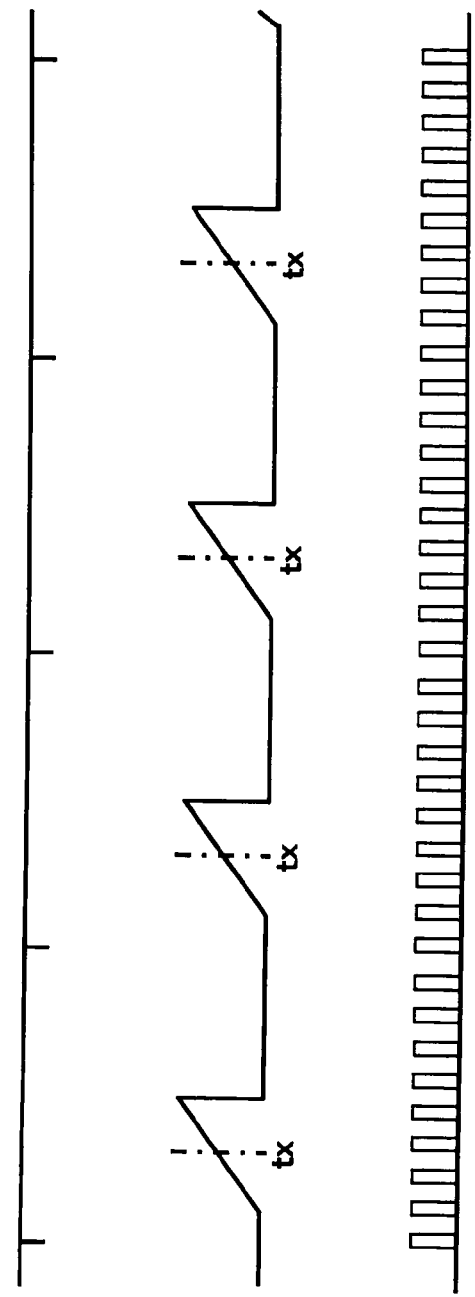
FIG.12A Scanning operation
FIG.12B Vertical synchronizing signal
FIG.12C Exposure timing of central pixel
FIG.12D Auxiliary light emission

US 7,609,317 B2

ELECTRONIC CAMERA AND AUTOMATIC FOCUSING METHOD FOR GENERATING A LIGHT EXPOSURE CONTROL SIGNAL ACCORDING TO A CENTRAL TIMING

CROSS REFERENCES TO RELATED APPLICATIONS

The present invention contains subject matter related to Japanese Patent Application JP 2004-197194 filed in the Japanese Patent Office on Jul. 2, 2004, and Japanese Patent Application JP 2004-368320 filed in the Japanese Patent Office on Dec. 20, 2004, the entire contents of which being incorporated herein by reference.

BACKGROUND OF THE INVENTION

1. Field of the Invention

The present invention relates to an electronic camera and an automatic focusing method.

2. Description of the Related Art

Electronic image pickup apparatus, or so-called digital cameras, formed by using a CCD (charge coupled device) image sensor as photoelectric conversion elements are being popularly marketed.

Such digital cameras are generally equipped with an auto focus control feature of automatically focusing the camera lens. While there are a number of auto focus control systems available to digital cameras, the system of generating an estimated in focus value by extracting the contrast, the high frequency components and the like of the detection range of the image to be picked up and adjusting the lens position so as to maximize the estimated in focus value is currently in the main stream.

FIG. 1 shows a graph of estimated in focus value relative to a lens position. Referring to FIG. 1, the estimated in focus value (Y-axis) is maximized relative to the lens position (X-axis) at the in focus position and decreases as a function of the distance from the in focus position toward the far side (forwardly out of focus) and the near side (backwardly out of focus) to show a hilly curve. Therefore, for auto focus control, it is only necessary to control the lens position of the focusing lens in such a way that the estimated in focus value is found at the top of the hilly curve.

When moving the focusing lens so as to bring the estimated in focus value to the top of the hilly curve, it is necessary to detect the gradient of the hilly curve at the point where the estimated in focus value is found and determine the current lens position relative to the in focus position. That is, it is necessary to determine if the current lens position is at the far side or at the near side relative to the in focus position.

FIG. 1 also shows a proposed method for determining the current lens position relative to the in focus position. Referring to FIG. 1, according to the proposed method, the focusing lens is subjected to micro-oscillations to such an extent that they do not affect the image to be picked up in order to computationally determine the positiveness or negativeness of the fluctuating component of the estimated in focus value (differential component dy/dx) (see, inter alia, Patent Document 1: Japanese Patent Application Laid-Open Publication No. 10-239579). The operation of subjecting the focusing lens to micro-oscillations for auto focus control is referred to as wobbling.

A specific example of wobbling operation will be described by referring to FIG. 2. In the graph of FIG. 2, the horizontal axis represents time (field unit) and the vertical axis represents the focusing lens position.

In the wobbling operation, the focusing lens is moved toward the near side in the first time period (T1) by a predetermined distance. Subsequently, the focusing lens is held standing still for a predetermined period in the second time period (T2). Then, the focusing lens is moved toward the far side in the third time period (T3) by a predetermined distance. Finally, the focusing lens is held standing still again for a predetermined period in the fourth time period (T4). Then, the sequence of move and stop sessions of the first through fourth time periods is repeated for the wobbling operation. The estimated in focus value is detected both in the second time period and the fourth time period and the difference of the two values is computed in order to detect the fluctuating component (differential component dy/dx) in the wobbling operation.

SUMMARY OF THE INVENTION

Meanwhile, digital cameras comprising a C-MOS (complementary—metal oxide semiconductor) image sensor as photoelectric conversion elements have been proposed in recent years.

The largest difference between the CCD image sensor and the C-MOS image sensor lies in that the CCD image sensor transfers the electric charge of each pixel by means of a CCD, whereas the C-MOS image sensor reads out the signal of each pixel by progressive scanning.

Since the C-MOS image sensor reads out the signal from each pixel by progressive scanning, the exposure timing is not unique and identical in each image. In other words, the exposure timing differs from pixel to pixel.

For example, referring to FIG. 3, if the exposure timing of the leading pixel of a field and that of the tail end pixel are compared, there is a time difference that is substantially equal to a field period.

For this reason, when computing the quantity of change in the estimated in focus value by conducting a wobbling operation, the focusing lens can move during the exposure period of the pixels in the detection range. Then, the sensitivity of detecting the quantity of change in the estimated focal point is reduced to make it no longer possible to accurately perform the auto focus control operation at high speed.

Additionally, when the estimated in focus value is generated by a scanning operation of moving the focusing lens as shown in FIG. 4A, there arises no problem for the CCD image sensor because the exposure timing is unique and identical for all the pixels as shown in FIG. 4C, although the focusing lens can be moved during the exposure operation of the pixels in the detection range for the C-MOS image sensor. Then, the sensitivity of detecting the estimated in focus value is also reduced to make it no longer possible to accurately perform the auto focus control operation at high speed.

When an LED (light emitting diode) laser beam is irradiated for auto focus control when picking up an image of an object showing only a weak contrast, the timing of light emission as shown in FIG. 4D may be satisfactory for the CCD image sensor because the exposure timing is unique and identical for all the pixels, although a discrepancy can arise between the exposure timing and the timing of light emission of the LED laser for the pixels in the detection rage in a wobbling operation or a scanning operation.

In view of the above-identified problem, it is desirable to provide an electronic camera and an automatic focusing method adapted to perform an accurate auto focus control operation at high speed.

According to the present invention, there is provided an electronic camera comprising: an image sensor for exposing a plurality of two-dimensionally arranged photoelectric conversion elements to light by progressive scanning and generating a video signal by reading an electric signal from each of the photoelectric conversion elements; a lens section having a focusing lens operating as part of an optical system for converging an image of an object of shooting and adapted to adjust the focusing position of the object of shooting and a movement control section for moving the focusing lens to the near side and the far side; a wobbling control section for generating a wobbling control signal for causing the focusing lens to do a wobbling operation of repeating a series of operations including a near side drive operation of driving the focusing lens to move to the near side by a predetermined distance, a near side stop operation of stopping the focusing lens at the near side for a predetermined period of time after the near side drive operation, a far side drive operation of driving the focusing lens to move to the far side by a predetermined distance after the near side stop operation and a far side stop operation of stopping the focusing lens at the far side for a predetermined period of time after the far side drive operation at every 2×n (n being a natural number) field periods; an estimated in focus value computing section for generating an estimated in focus value to indicate the degree of in focus of the image of the object of shooting according to the video signals of a predetermined range in the image; an in focus direction determining section for computing the quantity of change in the estimated in focus value during the wobbling operation and determining the direction to be followed by the focusing lens to become in focus on the basis of the quantity of change; and a drive section for driving the focusing lens to move and become in focus on the basis of the estimated in focus value and the direction to be followed to become in focus and driving the movement control section based on the wobbling control signal.

In an electronic camera according to the invention as defined above, the wobbling control section is adapted to generate the wobbling control signal so as to make the central timing in the time period of exposure to light of the central pixel of the predetermined range in the image substantially agree with the central timing of the period of the near side stop operation and that of the period of the far side stop operation.

Alternatively, in an electronic camera according to the invention as defined above, the wobbling control section is adapted to generate the wobbling control signal so as to make the period of exposure to light of the pixel for generating the estimated in focus value to be found within the period of the near side stop operation and the far side stop operation.

According to the present invention, there is provided an automatic focusing method to be used with an electronic camera having an image sensor for exposing a plurality of two-dimensionally arranged photoelectric conversion elements to light by progressive scanning and generating a video signal by reading an electric signal from each of the photoelectric conversion elements, the method comprising the steps of: causing the focusing lens for adjusting the focusing position of an object of shooting to do a wobbling operation of repeating a series of operations including a near side drive operation of driving the focusing lens to move to the near side by a predetermined distance, a near side stop operation of stopping the focusing lens at the near side for a predetermined period of time after the near side drive operation, a far side drive operation of driving the focusing lens to move to the far side by a predetermined distance after the near side stop operation and a far side stop operation of stopping the focusing lens at the far side for a predetermined period of time after the far side drive operation at every 2×n (n being a natural number) field periods; generating an estimated in focus value to indicate the degree of in focus of the image of the object of shooting according to the video signals of a predetermined range in the image; and computing the quantity of change in the estimated in focus value during the wobbling operation, determining the direction to be followed by the focusing lens to become in focus on the basis of the quantity of change and driving the focusing lens to move and become in focus on the basis of the estimated in focus value and the direction to be followed to become in focus for the purpose of focus adjustment.

In an automatic focusing method according to the invention as defined above, the central timing in the time period of exposure to light of the central pixel of the predetermined range in the image is made to substantially agree with the central timing of the period of the near side stop operation and that of the period of the far side stop operation in the wobbling operation.

Alternatively, in an automatic focusing method according to the invention as defined above, the period of exposure to light of the pixel for generating the estimated in focus value is made to be found within the period of the near side stop operation and the far side stop operation in the wobbling operation.

According to the present invention, there is provided an electronic camera comprising: an image sensor for exposing a plurality of two-dimensionally arranged photoelectric conversion elements to light by progressive scanning and generating a video signal by reading an electric signal from each of the photoelectric conversion elements; a lens section having a focusing lens operating as part of the optical system for converging an image of an object of shooting and adapted to adjust the focusing position of the object of shooting and a movement control section for moving the focusing lens to the near side and the far side; a scanning control section for generating a scanning control signal for causing the focusing lens to do a scanning operation of repeating a series of operations including a drive operation of driving the focusing lens to move in a predetermined direction by a predetermined distance and a stop operation of stopping for a predetermined period of time after the drive operation; an estimated in focus value computing section for generating an estimated in focus value to indicate the degree of in focus of the image of the object of shooting according to the video signals of a predetermined range in the image; and a drive section for driving the focusing lens to move and become in focus on the basis of the estimated in focus value and driving the movement control section based on the wobbling control signal.

In an electronic camera according to the invention as defined above, the scanning control section is adapted to generate the scanning control signal so as to make the central timing in the time period of exposure to light of the central pixel of the predetermined range in the image substantially agree with the central timing of the period of the stop operation.

Alternatively, in an electronic camera according to the invention as defined above, the scanning control section is adapted to generate the scanning control signal so as to make the period of exposure to light of the pixel for generating the estimated in focus value to be found within the period of stop operation.

According to the present invention, there is provided an automatic focusing method to be used with an electronic camera having an image sensor for exposing a plurality of two-dimensionally arranged photoelectric conversion elements to light by progressive scanning and generating a video signal by reading an electric signal from each of the photoelectric conversion elements, the method comprising the steps of: causing the focusing lens for adjusting the focusing position of an object of shooting to do a scanning operation of repeating a series of operations including a drive operation of driving the focusing lens to move in a predetermined direction by a predetermined distance and a stop operation of stopping for a predetermined period of time after the drive operation; generating an estimated in focus value to indicate the degree of in focus of the image of the object of shooting according to the video signals of a predetermined range in the image; and driving the focusing lens to move and become in focus on the basis of the estimated in focus value for the purpose of focus adjustment.

In an automatic focusing method according to the invention as defined above, the central timing in the time period of exposure to light of the central pixel of the predetermined range in the image is made to substantially agree with the central timing of the period of the stop operation.

Alternatively, in an automatic focusing method according to the invention as defined above, the period of exposure to light of the pixel for generating the estimated in focus value is made to be found within the period of stop operation.

Thus, in an electronic camera and an automatic focusing method according to the invention, the central timing in the time period of exposure to light of the central pixel of the predetermined range in the image is made to substantially agree with the central timing of the period of the near side stop operation and that of the period of the far side stop operation in the wobbling operation.

Alternatively, in an electronic camera and an automatic focusing method according to the invention, the period of exposure to light of the pixel for generating the estimated in focus value is made to be found within the period of the near side stop operation and the far side stop operation in the wobbling operation.

With either of the above arrangements, an electronic camera and an automatic focusing method according to the invention can optimize the relationship between the timing of the wobbling operation and the timing of exposure to light of the pixel for detecting the estimated in focus value. Therefore, it is possible to realize an accurate and high speed auto focus control.

Thus, in an electronic camera and an automatic focusing method according to the invention, the central timing in the time period of exposure to light of the central pixel of the predetermined range in the image is made to substantially agree with the central timing of the period of the stop operation.

Alternatively, in an electronic camera and an automatic focusing method according to the invention, the period of exposure to light of the pixel for generating the estimated in focus value is made to be found within the period of stop operation.

With either of the above arrangements, an electronic camera and an automatic focusing method according to the invention can optimize the relationship between the timing of the scanning operation and the timing of exposure to light of the pixel for detecting the estimated in focus value.

In an electronic camera and an automatic focusing method according to the invention, an auxiliary light source for irradiating an object of shooting showing a low luminance level emits light at time intervals shorter than the exposure time of exposing each photoelectric conversion element to light.

With this arrangement, an electronic camera and an automatic focusing method according to the invention can make an entire image to show a sufficient luminance so that it is possible to realize an accurate and high speed auto focus control.

BRIEF DESCRIPTION OF THE DRAWINGS

FIGS. 6A through 6C are schematic illustrations of one or more than one detection ranges and a specific region;

FIGS. 8A through 8C are schematic illustrations of the wobbling operation (in the case of four field periods) of the focusing lens of a video camera realized by applying the present invention;

FIGS. 9A through 9C are schematic illustrations of the wobbling operation (in the case of two field periods) of the focusing lens of a video camera realized by applying the present invention;

FIGS. 10A through 10C are schematic illustrations of the scanning operation (in the case of two field periods) of the focusing lens of a video camera realized by applying the present invention;

FIGS. 11A through 11C are schematic illustrations of the scanning operation (in the case of one field period) of the focusing lens of a video camera realized by applying the present invention; and FIGS. 12A through 12D are schematic illustrations of the light emitting operation (in the case of one field period) of the auxiliary light source of a video camera realized by applying the present invention.

DETAILED DESCRIPTION OF THE PREFERRED EMBODIMENTS

Now, the present invention will be described by referring to the accompanying drawings that illustrate an embodiment of electronic video camera (to be referred to simply as video camera hereinafter) according to the invention.

Figure 1:
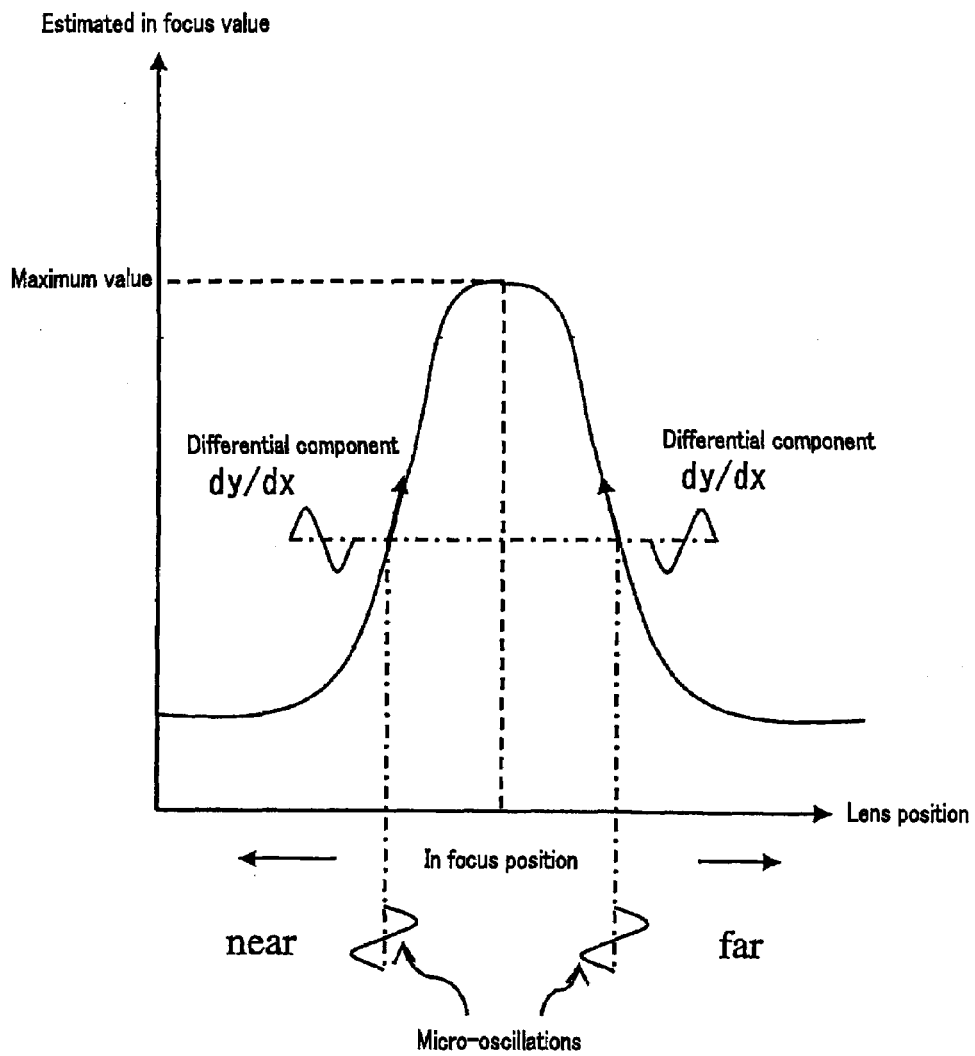
FIG. 1 is a graph of estimated in focus value relative to the position of focusing lens.
Figure 2:
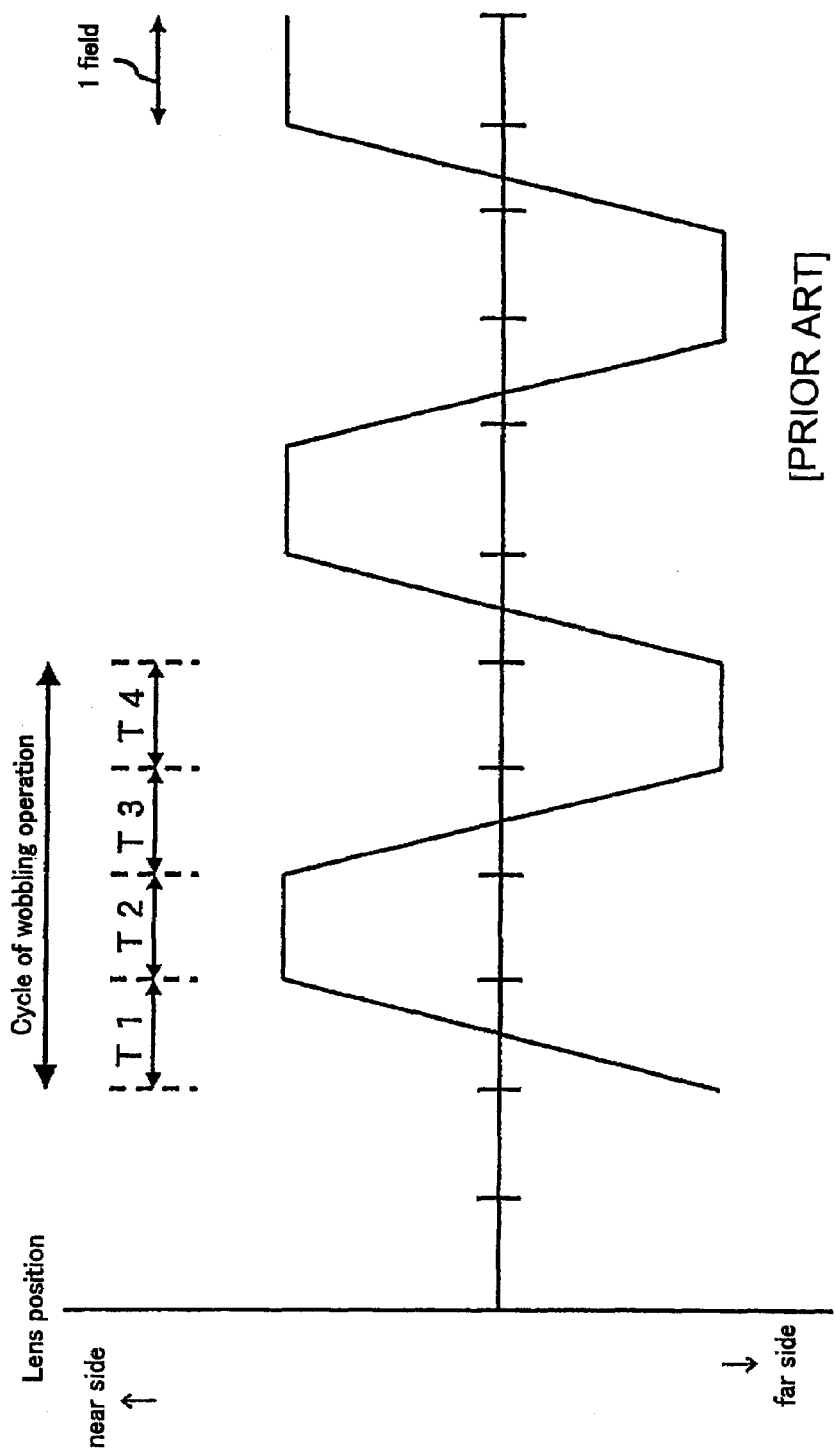
FIG. 2 is an illustration of the wobbling operation of the focusing lens of a known video camera.
Figure 3:
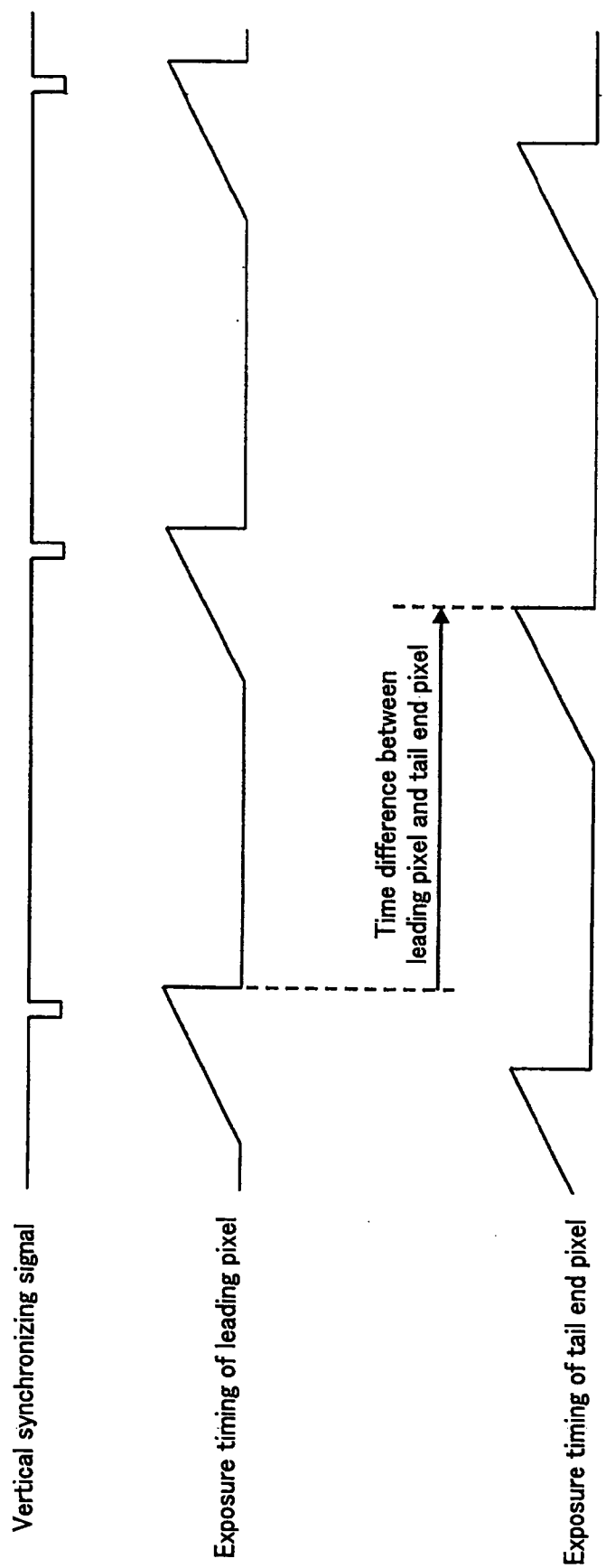
FIG. 3 is a graph illustrating the time difference between the exposure timing of the leading pixel of a field and that of the tail end pixel of a C-MOS image sensor.
Figure 4:
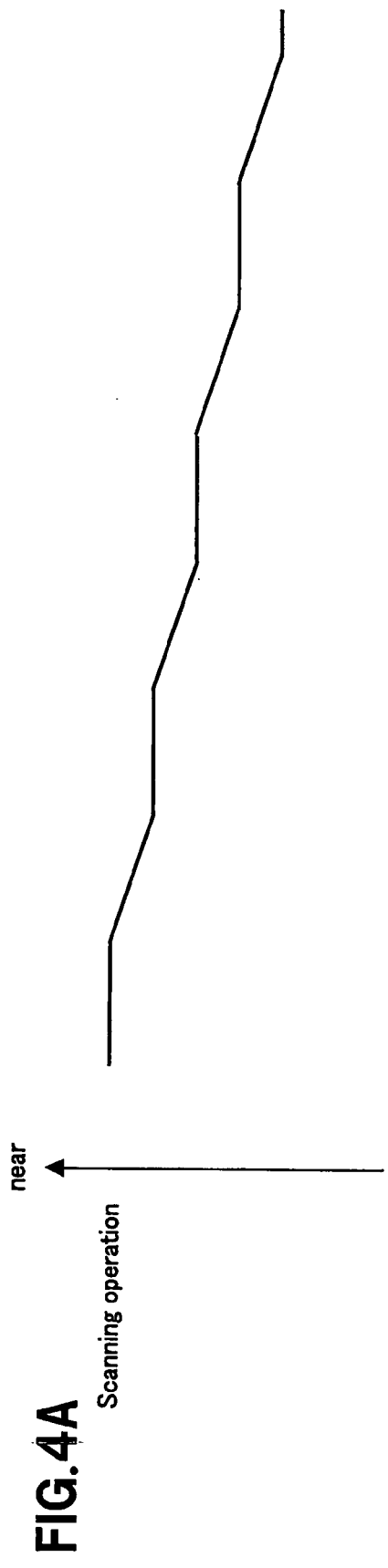
FIG. 4 is a schematic illustration of a scanning operation of the focusing lens of a known video camera.
Figure 5:
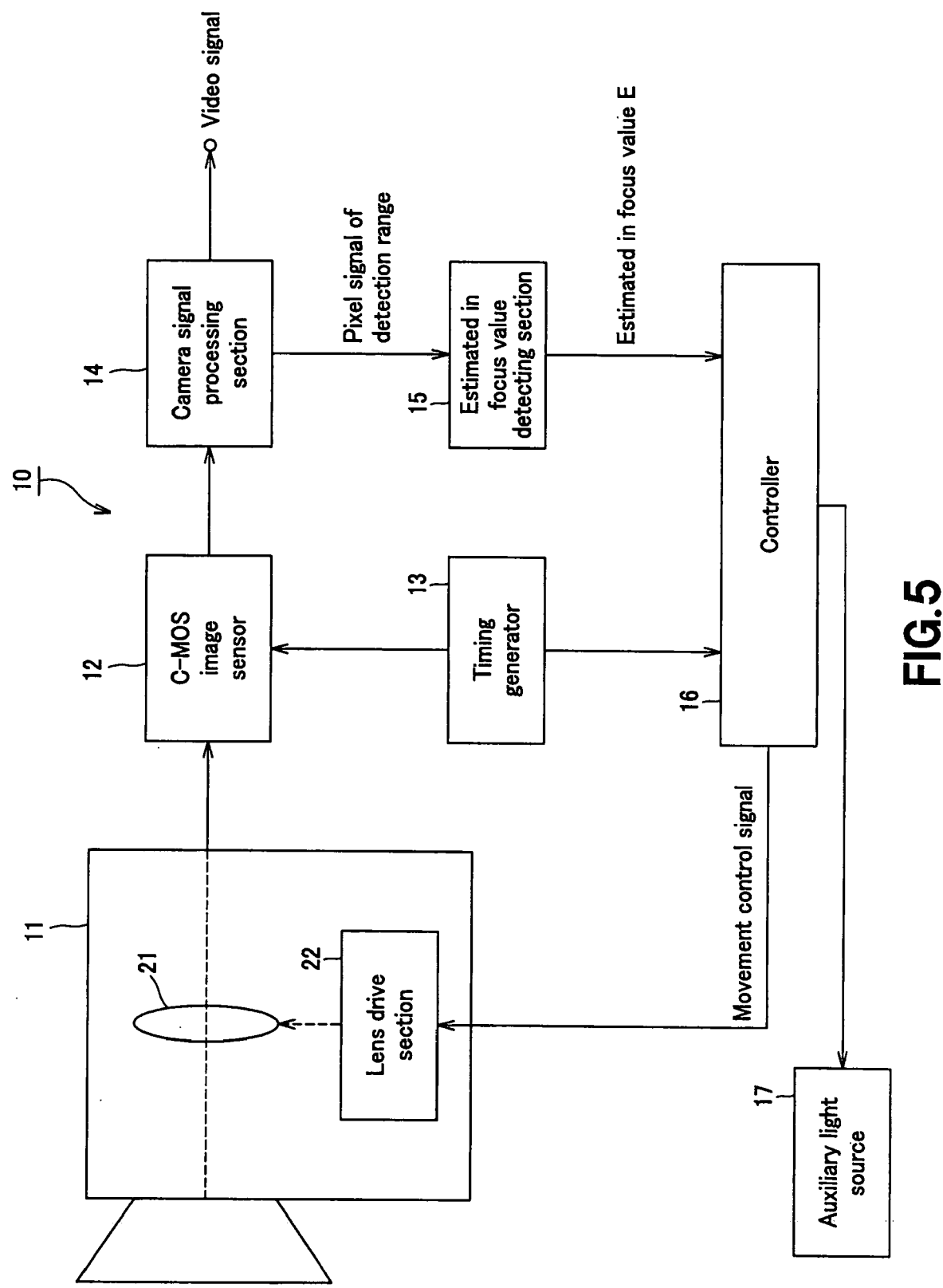
FIG. 5 is a schematic block diagram of a video camera realized by applying the present invention.

FIG. 5 is a schematic block diagram of a video camera 10 realized by applying the present invention.

The video camera 10 comprises a lens unit 11, a C-MOS (complementary—metal oxide semiconductor) image sensor 12, a timing generator 13, a camera signal processing section 14, an estimated in focus value detecting section 15 and a controller 16.

The lens unit 11 contains therein a focusing lens 21 and a lens drive section 22 for driving the focusing lens 21 and other lenses. The lens unit 11 additionally contains other components such as an optical system including a zoom lens, an infrared cut filter for cutting infrared rays of incident light, an aperture blade for limiting the quantity of incident light and sectors for blocking incident light, an aperture drive section for driving the aperture blade and a shutter drive section for driving the sectors.

The focusing lens 21 in the lens unit 11 is arranged in such a way that its optical axis agrees with the vertical line extending substantially from the center of the light receiving surface of the C-MOS image sensor 12. The focusing lens 21 is arranged so as to be able to linearly move back and forth along the optical axis thereof. The in focus position of the image formed on the light receiving plane of the C-MOS image sensor 12 is shifted as a function of the position of the movable focusing lens 21. The movable focusing lens 21 is controlled for its position by the controller 16 by way of the lens drive section 22.

The C-MOS image sensor 12 converts the image forming light on the light receiving plane thereof that comes from the object of shooting by way of the lens unit 11 into electric video signals on a pixel by pixel basis and outputs the video signals. The C-MOS image sensor 12 is controlled by the timing generator 13 for the timings of exposure to light and those of signal reading. Note that the C-MOS image sensor 12 is exposed to light at timings different for different pixels unlike a CCD that is exposed to light collectively at a same and identical timing and the signals of the pixels are read out by sequential scanning. The video signals read out from the C-MOS image sensor 12 are supplied to the camera signal processing section 14.

The timing generator 13 generates various synchronizing signals such as vertical synchronizing signals.

The camera signal processing section 14 executes analog processes including a sampling process and an amplifying process on the video signals supplied from the C-MOS image sensor 12, digitizes them by way of A/D conversion and adjusts them for gamma correction, white balance and so on. After the processing of the signals, the camera signal processing section 14 converts them into digital video signals of the format required for a television system such as the NTSC system or a recording medium and outputs them to the outside.

The estimated in focus value detecting section 15 detects the estimated in focus value E necessary for controlling the auto focus (AF) feature from the video signals being processed by the camera signal processing section 14 on a field by field basis. The estimated in focus value E necessary for controlling the auto focus feature is determined from the quantity of the high frequency component contained in and the contrast value of a detection range of an image. If the quantity of the high frequency component is large and the contrast is high in the detection range, the detection range is in focus. To the contrary, if the quantity of the high frequency component is small and the contrast is low in the detection range, the detection range is out of focus. In short, the estimated in focus value E indicates the degree to which the detection range of an image is in focus.

Generally, a single detection range is defined at the center of an image as shown in FIG. 6A. However, two or more than two detection ranges may be defined at positions off the center of the image as shown in FIGS. 6B and 6C.

A region that includes all the detection ranges in an image as shown by the dashed line in FIGS. 6A, 6B and 6C is referred to as specific region hereinafter.

The controller 16 controls the components of the video camera 10 for auto focus control and other functions.

The video camera 10 having the above described configuration can pick up an image of an object of shooting and output video signals. The output video signals are then recorded typically on a hard disc or an optical disc and/or displayed on a monitor screen.

The video camera 10 is equipped with an auxiliary light source 17 for making the object of shooting to show a sufficiently strong contrast even in a dark environment or in back light. The auxiliary light source 17 typically comprises an LED (light emitting diode) laser and irradiates the object of shooting showing a weak contrast with a laser beam. For instance, it is possible to use an LED laser for the auxiliary light source 17 and three-dimensionally reproduce an image of the object of shooting by means of a hologram adapted to record both the amplitude and the phase of light in order to bring the object of shooting showing a weak contrast into focus.

Now, the auto focus control feature of the video camera 10 will be described below.

Auto focus control refers to a process of automatically moving the focusing lens 21 under control and adjusting it to bring the object of shooting into focus. While an imaging operation is going on, the controller 16 constantly operates for auto focus control so as to output an image in an optimally in focus condition. A wobbling operation and a scanning operation will be described below for auto focus control.

(Wobbling Operation)

Figure 7:
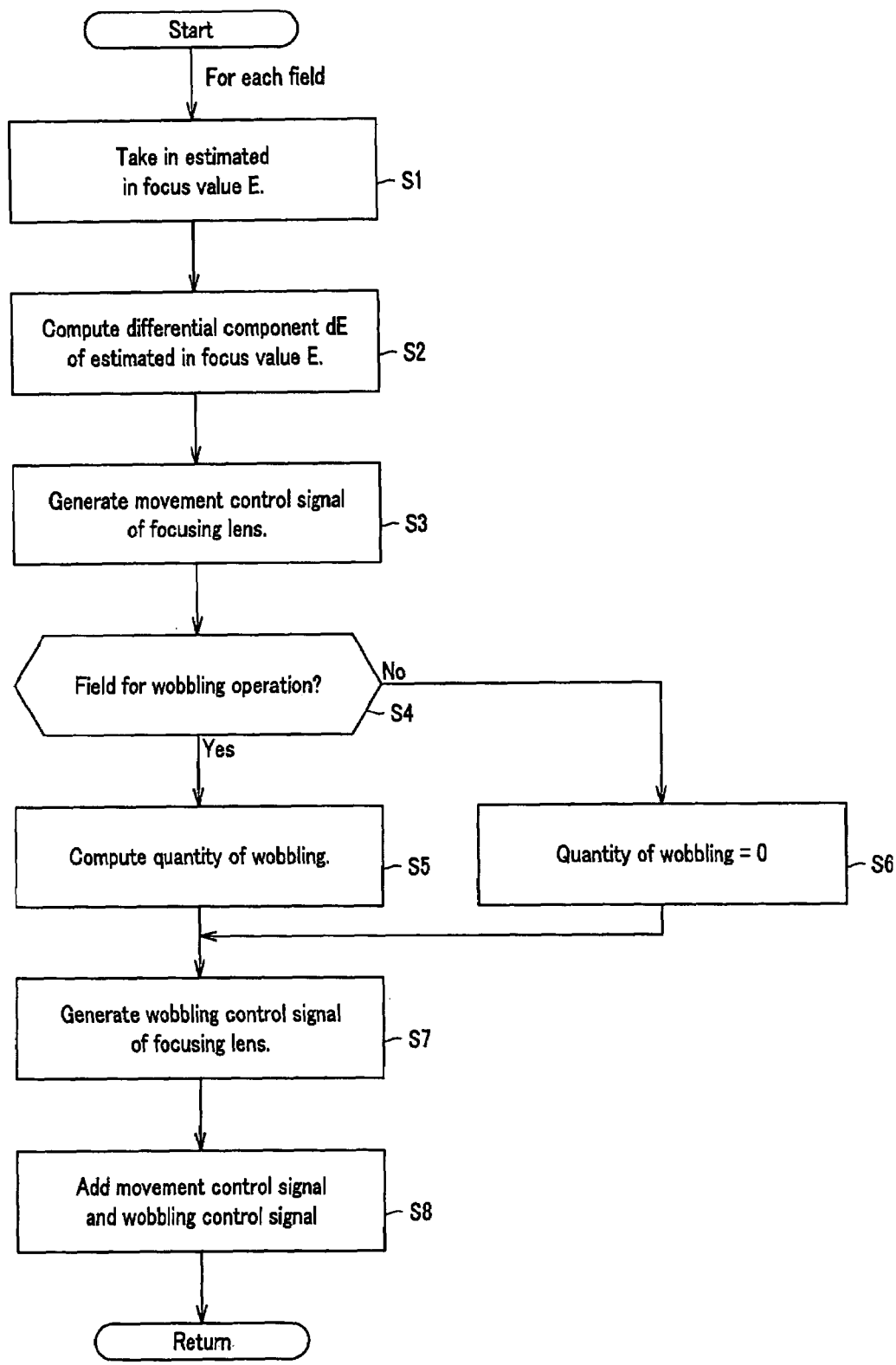
FIG. 7 is a flow chart of the operation of computationally determining a movement control signal for a focusing lens.

Now, the sequence of operation (Step S1 through Step S8) of computationally determining a movement control signal for driving the focusing lens 21 to move that is required for auto focus control will be described by referring to FIG. 7. Note that the sequence of operation of Step S1 through S8 that is described below will be conducted by the controller 16 for each field in a wobbling operation.

Firstly, the controller 16 reads out the estimated in focus value E of the field from the estimated in focus value detecting section 15 (Step S1).

Then, the controller 16 computationally determines the differential component dE of the estimated in focus value from the taken out estimated in focus value E and the estimated in focus value E of the past field (Step S2).

Subsequently, the controller 16 computationally determines a movement control signal for driving the focusing lens 21 to the just in focus position (Step S3). In other words, it is necessary to drive the focusing lens 21 to move so as to make the estimated in focus value to be found at the top of a hilly curve. For this purpose, the controller 16 computationally determines the distance and the direction from the current position of the focusing lens 21 to the just in focus position thereof on the basis of the estimated in focus value E and the differential component dE and generates a movement control signal for driving the focusing lens 21 from the current position to the just in focus position on the basis of the distance and the direction that are computationally determined.

Thereafter, the controller 16 judges if the next field is a field to be finely moved to the far side or to the near side for a wobbling operation (Step S4). If the next field is a field to be subjected to a wobbling operation, the controller 16 computationally determines the quantity of wobbling in Step S5. If, on the other hand, the next field is not a field to be subjected to a wobbling operation, the controller 16 selects 0 for the quantity of wobbling in Step S6.

Then, the controller 16 generates a wobbling control signal for finely driving the focusing lens 21 alternately to the far side and to the near side on the basis of the quantity of wobbling computationally determined in Step S5 or S6 (Step S7).

Thereafter, the controller 16 adds the movement control signal determined in Step S3 and the wobbling control signal determined in Step S6 to generate a total movement control signal for the focusing lens 21.

Then, the controller 16 applies the total movement control signal determined in the above described manner to the lens drive section 22. The lens drive section 22 drives the focusing lens 21 according to the total movement control signal. As a result, it is possible for the video camera 10 to optimally adjust the focus for video signals.

Now, the wobbling operation of the video camera 10 will be described in greater detail by referring to FIGS. 8A through 9C.

FIGS. 8A and 9A illustrate the movement of the focusing lens 21 when only a wobbling control signal is applied to it (in other words, when the movement control signal for driving the focusing lens 21 to move to the just in focus position is equal to 0). More specifically, in the graphs of FIGS. 8A and 9A, the horizontal axis represents time and the vertical axis represents the position of the focusing lens 21. FIGS. 8B and 9B illustrate the timing of the vertical synchronizing signal of the video signal output from the timing generator 13. FIGS. 8C and 9C illustrate the timing of exposure to light of the pixel at the center of the specific region (e.g., pixel c in FIGS. 6A through 6C).

FIGS. 8A through 8C are schematic illustrations of the wobbling operation in the case where the wobbling operation has four field periods, whereas FIGS. 9A through 9C are schematic illustrations of the wobbling operation in the case where the wobbling operation has two field periods.

In the wobbling operation of the video camera 10, firstly the focusing lens 21 is driven to move toward the near side by a predetermined distance in the first period (T1). The predetermined distance is such a very small distance that it does not influence the picked up image at all. Then, the focusing lens 21 is forced to stop for a predetermined period of time in the second period (T2). Thereafter, the focusing lens 21 is driven to move toward the far side by a predetermined distance in the third period (T3). Subsequently, the focusing lens 21 is forced to stop for a predetermined period of time in the fourth period (T4). Thereafter, the cycle of operation from the first period to the fourth period is repeated.

The controller 16 generates a wobbling control signal that causes the focusing lens 21 to operate in the above-described manner.

Additionally, the controller 16 generates a wobbling control signal in such a way that the one cycle of wobbling operation of the focusing lens 21 corresponds to 2×n (n being a natural number) field periods.

At the same time, the controller 16 generates a wobbling control signal in such a way that, if the period from a vertical synchronizing signal to the timing of the start of a first period (T1) or the period from a vertical synchronizing signal to the timing of the start of a third period (T3) is equal to t0, the period t0 generates a wobbling control signal showing a value as expressed by formula (1) below.

$$t0 = (hs + he - s - (n \times v) - d)/2 - \epsilon \quad (1)$$

In the formula (1), hs represents the period from the vertical synchronizing signal to the timing of reading the first pixel in the specific region by the C-MOS image sensor 12. If, for example, the C-MOS image sensor 12 is adapted to sequentially scan an image from the left top corner to the right bottom corner of an image to read the signals of the pixels, hs is the period from the vertical synchronizing signal to the timing of reading the signal of the pixel at the left top corner of the specific region (pixel s in FIGS. 6A through 6C).

In the formula (1), he represents the period from the vertical synchronizing signal to the timing of reading the last pixel in the specific region by the C-MOS image sensor 12. If, for example, the C-MOS image sensor 12 is adapted to sequentially scan an image from the left top corner to the right bottom corner of an image to read the signals of the pixels, he is the period from the vertical synchronizing signal to the timing of reading the signal of the pixel at the right bottom corner of specific region (pixel e in FIGS. 6A through 6C).

In the formula (1), s represents the exposure time of each pixel (open time of the electronic shutter).

In the formula (1), v represents a field period.

In the formula (1), n represents the value expressed by n=T/(2×v), where T is the cycle period of the wobbling operation. Note that n is a natural number.

In the formula (1), d represents the moving time in the wobbling operation.

In the formula (1), $\epsilon$ represents a parameter for correcting the mechanical delay of the focusing lens 21.

As seen from the formula (1), it is possible to make the central timing tx in the time period of exposure to light of the central pixel of the specific region agree with the central timing ty of the second period (T2) and that of the fourth period (T4) by controlling the phase of the wobbling operation of the focusing lens 21 as shown in FIG. 8C.

In other words, it is possible to make the central timing of the period of the near side stop operation and that of the period of the far side stop operation in the wobbling operation agree with the central timing in the time period of exposure to light of the pixel to be used for detecting the estimated in focus value. Thus, the controller 16 can minimize the possibility of moving the lens due to the wobbling operation in the time period of exposure to light of the pixel to be used for detecting the estimated in focus value.

Additionally, as seen from the formula (1), as a result of the phase control of the wobbling operation of the focusing lens 21, the length of the exposure period of the pixel for detecting the estimated in focus value in the second period (T2) (the period of the near side stop operation) is made equal to that of the exposure period of the pixel for detecting the estimated in focus value in the fourth period (T4) (the period of the far side stop operation) even if shift of the lens occurs during the period of exposure to light of the pixel to be used for detecting the estimated in focus value. Differently stated, the length of the exposure period of the pixel for detecting the estimated in focus value in the first period (T1) (the period of the operation of finely moving toward the near side) is made equal to that of the exposure period of the pixel for detecting the estimated in focus value in the third period (T3) (the period of the operation of finely moving toward the far side).

Thus, the video camera 10 can make the effective exposure periods for detecting the estimated in focus value in the respective fields equal to each other and hence it is always possible to accurately detect the fluctuating component of the estimated in focus value, if any.

The phase of the wobbling operation is controlled in such a way that the central timing of the period of a stop operation of the wobbling operation is made to agree with the central timing of the period of exposure to light of the central pixel of a specific region in the above described embodiment so as to minimize the possibility of any shift of the lens by the wobbling operation during the period of exposure to light of the pixel to be used for detecting the estimated in focus value. However, instead of controlling the central timings so as to make them agree with each other, the phase of the wobbling operation may alternatively be so controlled as to prevent the lens from being shifted by the wobbling operation during the period of exposure to light of all the pixels to be used for detecting the estimated in focus value.

(Scanning Operation)

Now, the scanning operation for detecting the lens position for maximizing the estimated in focus value by driving the focusing lens 21 at a constant speed will be described below. This auto focus control operation is conducted by the controller 16 by outputting a movement control signal to the focusing lens 21 while an image pickup operation is going on. Auto focus control by means of a scanning operation is intended to prevent the focusing lens 21 from moving during the period of exposure to light of the pixel to be used for detecting the estimated in focus value, as is the case with the above-described wobbling operation.

Firstly, the controller 16 typically drives the focusing lens 21 to move to the nearest position for starting a scanning operation within the movable range of the lens unit 11. As the operation of driving the focusing lens 21 to the position for starting a scanning operation is completed, the focusing lens 21 typically moves toward the infinite end to start scanning.

The controller 16 reads the estimated in focus value E of the field, for example, from the closest end toward the infinite end from the in focus value detecting section 15 and computationally determines the movement control signal for driving the focusing lens 21 to move to the just in focus position in such a way that the estimated in focus value is found at the top of the hilly curve. Then, it actually drives the focusing lens 21 to move to the position that is judged to be the in focus position according to the movement control signal.

The timing of driving the focusing lens to move will be described below by referring to FIGS. 10A through 11C.

FIGS. 10A and 11A illustrate the movement of the focusing lens 21 when only a scanning control signal is applied to it (in other words, when the movement control signal for driving the focusing lens 21 to move to the just in focus position is equal to 0). More specifically, in the graphs of FIGS. 10A and 11A, the horizontal axis represents time and the vertical axis represents the position of the focusing lens 21. FIGS. 10B and 11B illustrate the timing of the vertical synchronizing signal of the video signal output from the timing generator 13. FIGS. 10C and 11C illustrate the timing of exposure to light of the pixel at the center of the specific region (e.g., pixel c in FIGS. 6A through 6C).

FIGS. 10A through 10C are schematic illustrations of the scanning operation in the case where the scanning operation has two field periods, whereas FIGS. 11A through 11C are schematic illustrations of the scanning operation in the case where the scanning operation has one field period.

In the scanning operation of the video camera 10, firstly the focusing lens 21 is driven to move toward the far side by a predetermined distance in the first period (T1). The predetermined distance is such a very small distance that it does not influence the picked up image at all. Then, the focusing lens 21 is forced to stop for a predetermined period of time in the second period (T2). Thereafter, the cycle of operation of the first period and the second period is repeated.

The controller 16 generates a scanning control signal that causes the focusing lens 21 to operate in the above-described manner.

Additionally, the controller 16 generates a scanning control signal in such a way that the one cycle of scanning operation of the focusing lens 21 corresponds to n (n being a natural number) field periods.

At the same time, the controller 16 generates a scanning control signal in such a way that, if the period from a vertical synchronizing signal to the timing of the start of a first period (T1) is equal to t0, the period t0 generates a scanning control signal showing a value as expressed by formula (2) below.

$$t0 = (hs + he - s - (n \times v) - d)/2 - \epsilon \qquad (2)$$

The formula (2) is identical with the above described formula (1), although when T represents the one cycle of scanning operation, n represents the value expressed by n=T/v (n being a natural number), where d represents the moving time in the scanning operation.

As seen from the formula (2), it is possible to make the central timing tx in the time period of exposure to light of the central pixel of the specific region agree with the central timing ty of the second period (T2) by controlling the phase of the scanning operation of the focusing lens 21 as shown in FIG 10C.

In other words, it is possible to make the central timing of the period of the stop operation of the scanning operation agree with the central timing in the time period of exposure to light of the pixel to be used for detecting the estimated in focus value. Thus, the controller 16 can minimize the possibility of moving the lens due to the scanning operation in the time period of exposure to light of the pixel to be used for detecting the estimated in focus value.

Thus, the video camera 10 can make the effective exposure periods for detecting the estimated in focus value in the respective fields equal to each other and hence it is always possible to accurately detect the fluctuating component of the estimated in focus value, if any.

The phase of the scanning operation is controlled in such a way that the central timing of the period of a stop operation of the scanning operation is made to agree with the central timing of the period of exposure to light of the central pixel of a specific region in the above described embodiment so as to minimize the possibility of any shift of the lens by the scanning operation during the period of exposure to light of the pixel to be used for detecting the estimated in focus value. However, instead of controlling the controlling the central timings so as to make them agree with each other, the phase of the scanning operation may alternatively be so controlled as to prevent the lens from being shifted by the scanning operation during the period of exposure to light of all the pixels to be used for detecting the estimated in focus value.

(Light Emitting Operation of Auxiliary Light Source)

Now, the light emitting operation of the auxiliary light source 17 for irradiating an object of shooting showing a weak contrast will be described below. Like the wobbling operation and the scanning operation that are described above, the auxiliary light source 17 is made to emit light in such a way that the central timing of a light emitting period is made to agree with the central timing of exposure to light of the central pixel of a specific region or it is made to emit light during the period of exposure to light of all the pixels to be used for detecting the estimated in focus value. With this arrangement, it is possible to realize an accurate and high speed auto focus control.

However, when the auxiliary light source is operated for light emission like the wobbling operation and the scanning operation that are described above and a C-MOS image sensor 12 is used, auxiliary light will be irradiated only to part of the image. Then, if, for instance, an LED laser is used as the auxiliary light source 17 and an object of shooting showing a weak contrast is brought into focus by means of a hologram adapted to record both the amplitude and the phase of light, it is difficult to obtain a hologram sufficient for reproducing a three-dimensional object of shooting.

While a sufficient hologram may be obtained by irradiating auxiliary light during all the cycle period of the wobbling operation or that of the scanning operation, the upper limit of the output energy of an LED laser is defined in the related safety standard such as the ISO (International Organization for Standardization) Standard.

Therefore, with an automatic focusing method according to the invention, the auxiliary light source 17 is driven to emit light at intervals shorter than the exposure time to meet the safety standard and make the object of shooting showing a weak contrast to show a sufficient luminance.

FIGS. 12A through 12D are schematic illustrations of the light emitting operation when the auxiliary light source 17 is driven to emit light at a cycle eight times quicker than the cycle of exposure. FIG. 12A shows the operation of the focusing lens 21 and FIG. 12B shows the timing of the vertical synchronizing signal of the video signal output from the timing generator 13. FIG. 12C shows the timing of exposure to light of the pixel at the central position of a specific region (e.g., pixel c in FIGS. 6A through 6C) and FIG. 12D shows the timing of emission of light of the auxiliary light source 17. Note that FIGS. 12A through 12D are schematic illustrations of the light emitting operation when the cycle of the scanning operation is equal to one field period.

Thus, the auxiliary light source 17 emits, for example, pulses of light at every vertical synchronizing period/2n (n being a natural number) according to the vertical synchronizing signal. The ratio of turned on period/turned off period is adjusted so as to drive the auxiliary light source 17 to emit light at pulse intervals shorter than the exposure time to meet the safety standard and obtain an image showing a sufficient luminance over the entire area of the image. As a result, it is possible to obtain a hologram sufficient for reproducing a three-dimensional object of shooting. Thus, it is possible to realize an accurate and high speed auto focus control.

It should be understood by those skilled in the art that various modifications, combinations, sub-combinations and alterations may occur depending on design requirements and other factors insofar as they are within the scope of the appended claims or the equivalents thereof.

What is claimed is:

1. An electronic camera comprising:
an image sensor for exposing a plurality of two-dimensionally arranged photoelectric conversion elements to light by progressive scanning and generating a video signal by reading an electric signal from the photoelectric conversion elements;
a lens section having a focusing lens for converging an image of an object, the focusing lens adapted to adjust the focusing position of the object and a movement control section for moving the focusing lens to a near side and a far side;
a wobbling control section for generating a wobbling control signal for causing the focusing lens to do a wobbling operation of repeating a series of operations including:
a near side drive operation of driving the focusing lens to move to the near side by a predetermined distance;
a near side stop operation of stopping the focusing lens at the near side for a predetermined period of time after the near side drive operation;
a far side drive operation of driving the focusing lens to move to the far side by a predetermined distance after the near side stop operation; and
a far side stop operation of stopping the focusing lens at the far side for a predetermined period of time after the far side drive operation at every 2×n (n being a natural number) field periods;
a focus value computing section for generating a focus value to indicate the degree of focus of the image according to the video signal of a predetermined range in the image;
an in focus direction determining section for computing a quantity of change in the focus value during the wobbling operation and determining a focusing direction for focusing the focusing lens based on the quantity of change; and
a drive section for driving the focusing lens to move and become in focus based on the focus value and the focusing direction and driving the movement control section based on the wobbling control signal;
the wobbling control section being adapted to generate the wobbling control signal for synchronizing exposure to light of a central pixel of the predetermined range in the image with the central timing of the near side stop operation and the central timing of the far side stop operation, the synchronization being based on a time period from a vertical synchronization signal to a timing of reading a first pixel and a timing of reading a final pixel of the predetermined range in the image.

2. An electronic camera comprising:
an image sensor for exposing a plurality of two-dimensionally arranged photoelectric conversion elements to light by progressive scanning and generating a video signal by reading an electric signal from the photoelectric conversion elements;
a lens section having a focusing lens for converging an image of an object, the focusing lens adapted to adjust the focusing position of the object and a movement control section for moving the focusing lens to a near side and a far side;
a wobbling control section for generating a wobbling control signal for causing the focusing lens to do a wobbling operation of repeating a series of operations including:
a near side drive operation of driving the focusing lens to move to the near side by a predetermined distance;
a near side stop operation of stopping the focusing lens at the near side for a predetermined period of time after the near side drive operation;
a far side drive operation of driving the focusing lens to move to the far side by a predetermined distance after the near side stop operation; and
a far side stop operation of stopping the focusing lens at the far side for a predetermined period of time after the far side drive operation at every 2×n (n being a natural number) field periods;
a focus value computing section for generating a focus value to indicate the degree of focus of the image according to the video signal of a predetermined range in the image;
an in focus direction determining section for computing a quantity of change in the focus value during the wobbling operation and determining a focusing direction for focusing the focusing lens based on the quantity of change; and
a drive section for driving the focusing lens to move and become in focus based on the focus value and the focusing direction and driving the movement control section based on the wobbling control signal;
the wobbling control section being adapted to generate the wobbling control signal, based on a time period from a vertical synchronization signal to a timing of reading a first pixel and a timing of reading a final pixel of the predetermined range in the image, such that the period of exposure to light of a pixel for generating the estimated in focus value is found within the period of the near side stop operation and the far side stop operation.

3. An automatic focusing method to be used with an electronic camera having a focusing lens and an image sensor for exposing a plurality of two-dimensionally arranged photoelectric conversion elements to light by progressive scanning and generating a video signal by reading an electric signal from the photoelectric conversion elements, the method comprising:

causing the focusing lens to perform a wobbling operation of repeating a series of operations including a near side drive operation of driving the focusing lens to move to a near side by a predetermined distance, a near side stop operation of stopping the focusing lens at the near side for a predetermined period of time after the near side drive operation, a far side drive operation of driving the focusing lens to move to a far side by a predetermined distance after the near side stop operation, and a far side stop operation of stopping the focusing lens at the far side for a predetermined period of time after the far side drive operation at every 2×n (n being a natural number) field periods;

generating a focus value to indicate the degree of focus of an image according to the video signal of a predetermined range in the image; and computing a quantity of change in the focus value during the wobbling operation;

determining a focusing direction for focusing the focusing lens based on the quantity of change; and driving the focusing lens to move and become in focus based on the focus value and the focusing direction;

synchronizing exposure to light of a central pixel of the predetermined range in the image with the central timing of the near side stop operation and the central timing of the far side stop operation in the wobbling operation, the synchronization being based on a time period from a vertical synchronization signal to a timing of reading a first pixel and a timing of reading a final pixel of the predetermined range in the image.

4. An automatic focusing method to be used with an electronic camera having a focusing lens and an image sensor for exposing a plurality of two-dimensionally arranged photoelectric conversion elements to light by progressive scanning and generating a video signal by reading an electric signal from the photoelectric conversion elements, the method comprising:

causing the focusing lens to perform, based on a wobbling control signal, a wobbling operation of repeating a series of operations including a near side drive operation of driving the focusing lens to move to a near side by a predetermined distance, a near side stop operation of stopping the focusing lens at the near side for a predetermined period of time after the near side drive operation, a far side drive operation of driving the focusing lens to move to a far side by a predetermined distance after the near side stop operation, and a far side stop operation of stopping the focusing lens at the far side for a predetermined period of time after the far side drive operation at every 2×n (n being a natural number) field periods;

generating a focus value to indicate the degree of focus of an image according to the video signal of a predetermined range in the image; and computing a quantity of change in the focus value during the wobbling operation;

determining a focusing direction for focusing the focusing lens based on the quantity of change; and driving the focusing lens to move and focus based on the focus value and the focusing direction;

the period of exposure to light of a pixel for generating the focus value being found within the period of the near side stop operation and the far side stop operation in the wobbling operation, and based on a time period from a vertical synchronization signal to a timing of reading a first pixel and a timing of reading a final pixel of the predetermined range in the image.

5. An electronic camera comprising:

an image sensor for exposing a plurality of two-dimensionally arranged photoelectric conversion elements to light by progressive scanning and generating a video signal by reading an electric signal from the photoelectric conversion elements;

a lens section having a focusing lens for converging an image of an object, the focusing lens adapted to adjust the focusing position of the object and a movement control section for moving the focusing lens;

a scanning control section for generating a scanning control signal for causing the focusing lens to move in a predetermined direction by a predetermined distance and stop for a predetermined period of time after moving;

a focus value computing section for generating a focus value to indicate the degree of focus of the image of the object according to the video signal of a predetermined range in the image; and a drive section for driving the focusing lens to move and focus based on the focus value and driving the movement control section based on the scanning control signal;

the scanning control section being adapted to generate the scanning control signal for synchronizing exposure to light of a central pixel of the predetermined range in the image with the central timing of the stop, the synchronization being based on a time period from a vertical synchronization signal to a timing of reading a first pixel and a timing of reading a final pixel of the predetermined range in the image.

6. An electronic camera comprising:

an image sensor for exposing a plurality of two-dimensionally arranged photoelectric conversion elements to light by progressive scanning and generating a video signal by reading an electric signal from the photoelectric conversion elements;

a lens section having a focusing lens for converging an image of an object, the focusing lens adapted to adjust the focusing position of the object and a movement control section for moving the focusing lens;

a scanning control section for generating a scanning control signal for causing the focusing lens to move in a predetermined direction by a predetermined distance and stop for a predetermined period of time after moving;

a focus value computing section for generating a focus value to indicate the degree of focus of the image of the object according to the video signal of a predetermined range in the image; and a drive section for driving the focusing lens to move and become in focus based on the focus value and driving the movement control section based on the scanning control signal;

the scanning control section being adapted to generate the scanning control signal, based on a time period from a vertical synchronization signal to a timing of reading a first pixel and a timing of reading a final pixel of the predetermined range in the image, such that the period of exposure to light of a pixel for generating the estimated in focus value is found within the period of stop operation.

7. An automatic focusing method to be used with an electronic camera having a focusing lens and an image sensor for exposing a plurality of two-dimensionally arranged photoelectric conversion elements to light by progressive scanning and generating a video signal by reading an electric signal from the photoelectric conversion elements, the method comprising:

- moving the focusing lens in a predetermined direction by a predetermined distance;
- stopping the focusing lens for a predetermined period of time after moving the focusing lens;
- generating a focus value to indicate the degree of focus of the image according to the video signal of a predetermined range in the image; and
- driving the focusing lens to move and focus based on the focus value;
- synchronizing exposure to light of a central pixel of the predetermined range in the image with the central timing of the period of time of stopping, the synchronization being based on a time period from a vertical synchronization signal to a timing of reading a first pixel and a timing of reading a final pixel of the predetermined range in the image.

8. An automatic focusing method to be used with an electronic camera having a focusing lens and an image sensor for exposing a plurality of two-dimensionally arranged photoelectric conversion elements to light by progressive scanning and generating a video signal by reading an electric signal from the photoelectric conversion elements, the method comprising:

- moving the focusing lens in a predetermined direction by a predetermined distance;
- stopping the focusing lens for a predetermined period of time after moving the focusing lens;
- generating a focus value to indicate the degree of focus of the image according to the video signal of a predetermined range in the image; and
- driving the focusing lens to move and focus based on the focus value;
- the period of exposure to light of a pixel for generating the focus value being found within the period time of stopping, and based on a time period from a vertical synchronization signal to a timing of reading a first pixel and a timing of reading a final pixel of the predetermined range in the image.

* * * * *